(12) United States Patent
Bomberg et al.

(10) Patent No.: US 10,697,174 B1
(45) Date of Patent: Jun. 30, 2020

(54) RETROFITTING WALL ASSEMBLY WITH WATER MANAGEMENT

(71) Applicants: Mark Bomberg, Ottawa (CA); Lowell E. Lingo, Jr., Morrisville, NY (US)

(72) Inventors: Mark Bomberg, Ottawa (CA); Lowell E. Lingo, Jr., Morrisville, NY (US)

( * ) Notice: Subject to any disclaimer, the term of this patent is extended or adjusted under 35 U.S.C. 154(b) by 0 days.

(21) Appl. No.: 16/593,975

(22) Filed: Oct. 5, 2019

(51) Int. Cl.
*E04B 1/62* (2006.01)
*E04B 1/74* (2006.01)
*B32B 5/26* (2006.01)
*C04B 7/02* (2006.01)

(52) U.S. Cl.
CPC ............... *E04B 1/625* (2013.01); *B32B 5/26* (2013.01); *C04B 7/02* (2013.01); *E04B 1/74* (2013.01); *B32B 2307/7265* (2013.01); *B32B 2419/00* (2013.01); *E04B 2001/745* (2013.01)

(58) Field of Classification Search
CPC ...... E04B 1/625; E04B 1/74; E04B 2001/745; B32B 5/26; B32B 2307/7265; B32B 2419/00; C04B 7/02
USPC .......................................................... 52/408
See application file for complete search history.

(56) References Cited

U.S. PATENT DOCUMENTS

| | | | | |
|---|---|---|---|---|
| 3,479,779 A | * | 11/1969 | Ziegler | E04C 2/284 52/144 |
| 3,839,519 A | * | 10/1974 | Weiner | B28B 19/0053 264/46.5 |
| 3,982,876 A | * | 9/1976 | Eisenbach | E04F 13/0862 425/501 |
| 4,694,624 A | * | 9/1987 | Juhas | E04C 1/397 52/223.7 |
| 5,600,930 A | * | 2/1997 | Drucker | B29C 33/0033 52/220.3 |
| 7,721,498 B2 | * | 5/2010 | Kang | E04F 15/203 52/177 |
| 7,735,282 B2 | * | 6/2010 | Price | E04B 7/225 52/408 |
| 8,621,799 B2 | * | 1/2014 | Sade | E04B 2/707 52/302.1 |
| 9,611,640 B2 | * | 4/2017 | Mayer | E04B 2/7457 |

(Continued)

FOREIGN PATENT DOCUMENTS

GB 2388181 A * 11/2003 ............... F24D 3/14

*Primary Examiner* — Jeanette E Chapman
(74) *Attorney, Agent, or Firm* — Law Office of Mark Levy

(57) ABSTRACT

A retrofitting appliqué for stepped application to a building wall construction. For external retrofitting, the system has an air barrier layer impermeable or semi-permeable for moisture, a ventilated air cavity used to modify temperature and/or remove water that may be coming from both sides or to modify the relative humidity of the ventilation air, a layer of thermal insulation, a composite material called Eco-Wrap with capillary active capability, in which a hydronic heating or cooling system may be located, and a surface finishing layer. For internal retrofitting, the system has an air barrier system arranged onto the wall of the building and separated from a layer of permeable or semi-permeable thermal insulation by a ventilated air gap. The layer of insulation, in turn, is in contact with a layer of Eco-Wrap. A permeable interior finishing layer that may also have capillary active performance is in contact with the Eco-Wrap. Methods for installing the retrofitting appliqué are also disclosed.

14 Claims, 10 Drawing Sheets

(56) References Cited

U.S. PATENT DOCUMENTS

| | | | | |
|---|---|---|---|---|
| 2002/0088184 | A1* | 7/2002 | Hiraki | E04B 1/74 52/79.1 |
| 2007/0144093 | A1* | 6/2007 | Messenger | E02D 27/02 52/309.12 |
| 2010/0287862 | A1* | 11/2010 | Goldberg | E04B 1/70 52/302.1 |
| 2011/0256786 | A1* | 10/2011 | Bomberg | E04B 1/625 422/1 |
| 2012/0317914 | A1* | 12/2012 | Bomberg | B32B 37/02 52/443 |

* cited by examiner

RETROFITTING WALL ASSEMBLY WITH WATER MANAGEMENT

FIELD OF THE INVENTION

The present invention relates to building assembly and, more specifically, to a composite thermal insulation system and interior or exterior finishing used in the construction or renovation of buildings to control exterior rain-water penetration and heat, air, and water vapor transmission through a building enclosure from either side of the wall applicable in all climates.

BACKGROUND OF THE INVENTION

Typically, an exterior insulation layer for use with walls of a building includes a thermal insulating material covered by a rain intrusion protection such as siding or stucco. Thermal insulation material can be impermeable or permeable to water vapor. Stucco can be a three-coat stucco (a three-coat, traditional, metal-lath-reinforced, cladding system) or one or two coat stucco (reinforced, applied in two layers) or a modern synthetic stucco (a thin lamina reinforced with fiberglass or polymeric mesh) used in Exterior Insulation and Finish Systems. Those plasters (stuccos or laminas) provide a barrier to rain entry. While the old masonry buildings used renderings with slack lime as the binder and provided a substantial capillary action, the renderings based on cement generally use polymeric admixtures that further reduce capillarity of the material. Portland cement plaster replaced the traditional renderings.

With the exception of brick veneer, all conventional rain controlling elements in building enclosures are focused on the reduction or elimination of water entry into building materials or components. For example, hydrophobic coatings or other film forming compositions may be applied on the exterior surface of Portland cement plaster to provide low water transmission, while retaining good flame retardancy and low smoke generation of the plaster. Similarly, a coating of polypropylene resin can be applied to the surface of a fibrous sheet to make the sheet impermeable to water and vapor. Subsequent treatment provides vapor permeability to the sheet while maintaining liquid water impermeability. The resultant product is particularly suited for use as a roofing-tile underlayment or as an air-infiltration barrier. Alternatively, water barriers may be coated with other elastomers, including dispersed layer fillers in liquid carriers, or may include a sheet of paper impregnated with asphalt or urethane compounds.

Yet three-coat Portland cement plaster is prone to cracking and subsequent water penetration. On the other hand, some synthetic stuccoes (a thin lamina reinforced with fiberglass mesh) are elastic and less prone to cracking, yet may not provide sufficient fire protection and drying ability to the wall as well as may lack the water storage capacity of the traditional three-coat lime-cement plaster.

Moisture management on the interior side of the exterior walls has been concentrated on water vapor retarder technology. For instance, one vapor barrier type includes polyamide (nylon) fibers that are modified with polyvinyl alcohol. Since these fibers are susceptible to moisture, the water vapor permeance of the membrane changes with relative humidity. Another barrier type comprises a sheet of a unitary, non-woven material that is spun-bonded from synthetic filamentary fibers. The sheet is then textured with protrusions to define channels oriented in multiple directions that provide a means by which a liquid on the first side of the sheet can drain. Various gypsum-based panels used as interior finish function well as an air barrier but do not contribute to water management. On the contrary, those including paper (cardboard) are sensitive to water and must be protected from prolonged exposure to water.

DESCRIPTION OF RELATED ART

U.S. Pat. No. 9,982,440 issued to Cole, et al. for INTEGRATED FIBER CEMENT AND FOAM AS INSULATED CLADDING WITH ENHANCEMENTS on May 19, 2018, describes an integrated fiber cement and foam cladding system that incorporates foam or similar light weight material to improve the insulation capacity of the cladding system. The system includes at least a fiber cement layer and a foam layer disposed on the backside of the fiber cement layer. The system improves the R-value of the building, a measure of the building's resistance to transferring heat or thermal energy.

SUMMARY OF THE INVENTION

The present invention recognizes that building enclosures must be designed differently for warm, mixed, and cold climates and therefore the principles defined here may have different representations in each of these climatic regions.

The general process of construction covered by this invention comprises five interacting layers, starting from an existing wall structure: 1) an air barrier layer impermeable or semi-permeable for moisture, 2) a ventilated air cavity used to modify temperature and/or remove water that may be coming from both sides or to modify the relative humidity of the ventilation air, 3) a layer of thermal insulation, 4) a composite material with capillary active capability, introduced here under a generic name "Eco-Wrap," in which a hydronic heating or cooling system may be located, and 5) a surface finishing layer that may also be an Eco-Wrap material designed for either the exterior or the interior surface of the wall.

One aspect of this invention is a process of construction leading to either an exterior or an interior retrofitting system that accelerates drying of moisture encapsulated during construction of a building enclosure, or drying when moisture which comes from condensation or incidental rain leaks at windows or other penetrations of that enclosure. Another aspect of this invention is an insulated cladding system for new building construction or an insulation system which is retrofit to the walls of existing buildings to provide adequate thermal comfort and water management capability.

In accordance with the present invention, there is provided a retrofitting appliqué for stepped application to a building wall construction. For external retrofitting, the system has an air barrier layer impermeable or semi-permeable for moisture, a ventilated air cavity used to modify temperature and/or remove water that may be coming from both sides or to modify the relative humidity of the ventilation air, a layer of thermal insulation, a composite material called Eco-Wrap with capillary active capability, in which a hydronic heating or cooling system may be located, and a surface finishing layer. For internal retrofitting, the system has an air barrier system arranged onto the wall of the building and separated from a layer of permeable or semi-permeable thermal insulation by a ventilated air gap. The layer of insulation, in turn, is in contact with a layer of Eco-Wrap. A permeable interior finishing layer that may also have capillary active performance is in contact with the Eco-Wrap. Methods for installing the retrofitting appliqué are also disclosed.

It is a principal object and advantage of the present invention to provide either an exterior or interior thermal insulating system (alternatively, both exterior and interior when applied simultaneously) and a process of construction of that insulating system, leading to an assembly that reduces energy consumption and improves the indoor environment while at the same time facilitating drying of any moisture enclosed during construction or from incidental sources during operation or occupancy of the building.

It is an additional object and advantage of the present invention to provide a system and method for dealing with water that comes from incidental rain leaks at windows or other penetrations, or failures of the vapor barrier of a building or its enclosure.

It is a further object and advantage of the present invention to provide an environmental control system for new buildings, or retrofit to existing buildings, that can be used either on the exterior of existing walls to provide adequate rain water absorption, storage, and accelerated removal capability; or on the interior of an existing wall to improve the indoor environment in the habitable or office space.

It is another object and advantage of the present invention to provide a method for constructing a layered exterior wall system resulting in improved transfer of water to an adjacent material layer having a higher activity index or higher storage capability, or to a ventilated cavity.

It is yet another object and advantage of the present invention to provide a method of preconditioning ventilation air in the ventilated cavity to modify both temperature and humidity thereof.

These and other objects and advantages of the present invention are more readily apparent with reference to the following detailed description and the accompanying drawings.

BRIEF DESCRIPTION OF THE DRAWINGS

A complete understanding of the present invention may be obtained by reference to the accompanying drawings, when considered in conjunction with the subsequent detailed description, in which.

Like reference numerals refer to like parts throughout the several views of the drawings.

DETAILED DESCRIPTION OF THE PREFERRED EMBODIMENT

Although the following detailed description contains specific details for the purposes of illustration, those of ordinary skill in the art will appreciate that variations and alterations to the following details are within the scope of the invention. Accordingly, the exemplary embodiments of the invention described below are set forth without any loss of generality to, and without imposing limitations upon, the claimed invention.

The invention is a retrofitting appliqué for stepped application to a building wall construction. For external retrofitting, the system has an air barrier layer impermeable or semi-permeable for moisture, a ventilated air cavity used to modify temperature and/or remove water that may be coming from both sides or to modify the relative humidity of the ventilation air, a layer of thermal insulation, a composite material called Eco-Wrap with capillary active capability, in which a hydronic heating or cooling system may be located, and a surface finishing layer. For internal retrofitting, the system has an air barrier system arranged onto the wall of the building and separated from a layer of permeable or semi-permeable thermal insulation by a ventilated air gap. The layer of insulation, in turn, is in contact with a layer of Eco-Wrap. A permeable interior finishing layer that may also have capillary active performance is in contact with the Eco-Wrap.

FIGS. 1-4, described hereinbelow, present an arrangement for the universal concept of environmental control (heat, air, water and water vapor flows).

Figure 1:
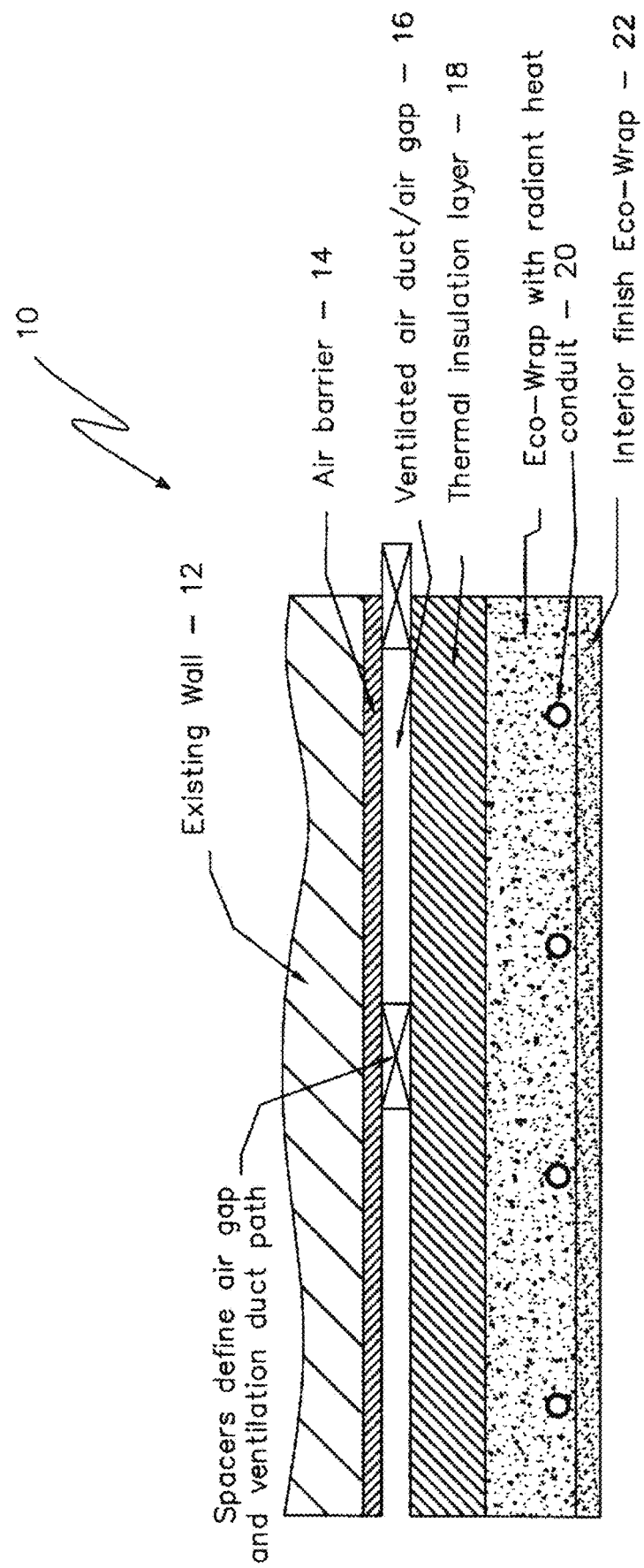
FIG. 1 is a cross-section, schematic view of the interior retrofit (RT) assembly in accordance with the present invention.

Referring now to FIG. 1, there is shown a schematic, cross-section view of an interior retrofit assembly 10 constructed in accordance with the principles of the present invention. Assembly 10 has five layers, starting from the existing wall structure 12 on the top: an air barrier 14; a ventilated air cavity 16; thermal insulation 18; Eco-Wrap with PEX tubing 20; and an interior finishing layer (Eco-Wrap or gypsum panels) 22.

Air barrier 14 and interior finish 22 are typically based on existing technology. Air barriers 42 are either trowel applied on masonry or adhesive sheets such as non-vulcanized rubbers for frame walls. Interior finishing layers 22 can be made either from gypsum or Eco-Wrap panels. Exterior finish 42 (FIG. 3) can either be lamina in the exterior insulation and finishing system (EIFS) or fiber reinforced cement panels. The key elements of water management are layers of Eco-Wrap 20 and application of air gap 14.

Assembly 10 provides a number of advantages over traditional structures because heating and cooling is integrated with wall 12. This system takes advantage of the thermal mass of wall 12, using the control of its temperature to define that of the indoor air. It is particularly suitable for an adaptable climate regime and for ensuring thermal comfort under varying room temperature.

Wall 12 also acts as a heat exchanger, modifying the temperature of ventilation air. The typical thickness of air cavity 16 is 20 mm (¾ inch) in the preferred embodiment, although other dimensions can be used without departing from the scope of the invention. Ventilation air passing through cavity 16 may dry existing wall 12. If permeable, thermal insulation 18 interacts with the capillary active (i.e., moisture buffering) Eco-Wrap material 20. The thickness of insulation layer 18 varies depending on the amount of insulation in existing wall 12. Finally, assembly 10 permits placing phase change materials (PCM) in air barrier 14 or thermal insulation layer 18, where their efficiency is much higher than in finishing layer 22, thereby increasing the effective thermal mass of wall 12 under design temperature conditions.

Thus, in a special case composite Eco-Wrap material 20 has an almost identical composition but uses a different proportion of components to ensure that, while the material surface is water resistant, the whole material layer will dry rapidly. To this end, different types of Eco-Wrap or classes are distinguished when one type is produced with different water vapor permeance capabilities.

Figure 9:
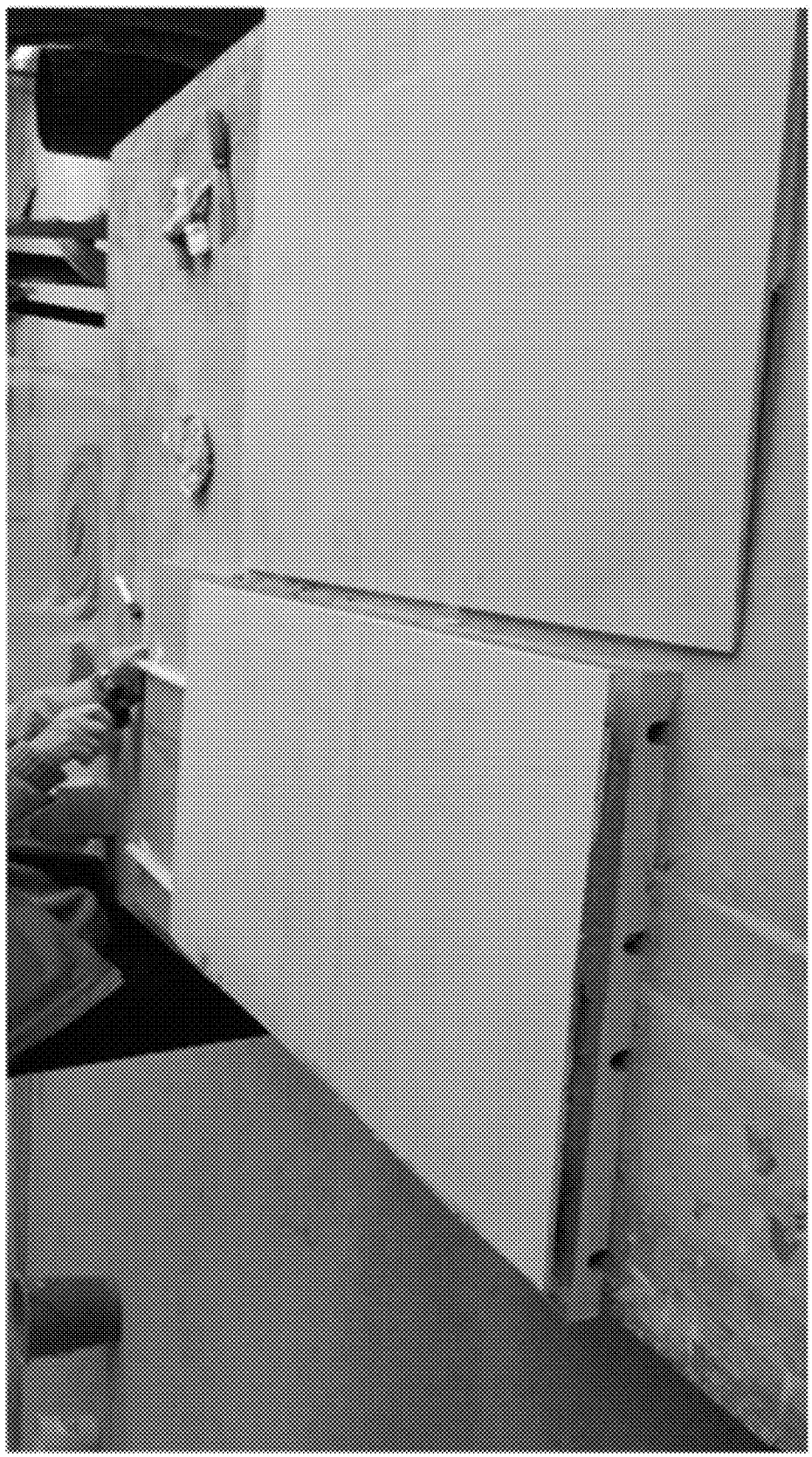
FIG. 9 is a photographic view of panels comprising extruded polystyrene, Eco-Wrap, and MgO boards tested in climatic chambers.

Thermal insulating layer 18 may be continuous (spray polyurethane foam) or constructed with boards (FIG. 9). These boards may be permeable for water vapor, such as expanded polystyrene or mineral fiber boards or they may be impermeable for water such as vacuum insulated panels encapsulated in spray foam insulation.

An objective of this invention is to control ingress of water in different forms (carried by air or diffusing as water vapor) and accelerate the rate of moisture removal from the building enclosure. To this end, water is removed by an action of gravity when heating/cooling layer 18 facing ventilated cavity 16 has drainage ability or ventilated cavity 16 enhances diffusion-based drying of the materials adjacent thereto. As discussed hereinbelow in the section of examples, a composite of mineral fiber insulation and spray polyurethane foam can provide a good combination of drainage and diffusion-based drying.

The specially designed Eco-Wrap composite 20 also provides enhanced capability for drying and, combined with ventilated air gap 16, can provide a universal method for water management. Eco-Wrap material 20 is different from typical plasters, and comprises four components:
1) a binder that typically includes S-type hydrated lime mixed with natural cements (pozzolanic materials) and Portland cement;
2) a fibrous aggregate mix that includes organic fibers obtained from recycled wood, newsprint, or other biological fibers mixed with post-industrial or post-consumer fibers such as polypropylene or PET;
3) a fine powder aggregate sand (ground glass, foams, etc.); and
4) a selected mix of biological and industrial polymers utilized to provide required dispersion of the recycled materials and bonding to the substrate.

There is no difference in the Eco-Wrap used for interior or exterior applications. Only the finishing layers are different for interior and exterior applications. The exterior finish 42 (FIG. 3) must have different water vapor permeance for different climatic zones. Typically, a reinforcement mesh, not shown, is placed between the bonding and finishing layers. The mesh is either a metal wire or a flexible polymeric mesh (e.g., fiberglass, polypropylene, etc.). Finishing layer 22, 32, or 42 may be of another Eco-Wrap or a traditional material used in exterior insulation finishing systems with a textured and pigmented coating or appropriate paints (mineral oil).

The process of construction in accordance with this invention comprises four or five interacting and, in themselves, often composite layers: 1) exterior or interior finish layer, 2) thermal insulation, 3) ventilated air gap, 4) an Eco-Wrap that may also function as air barrier, and, optionally, 5) a separate air barrier. The thermal insulating layer may be continuous (spray polyurethane foam) or constructed with boards that are permeable for water vapor, such as expanded polystyrene or eco-fiber boards. On the exterior, a spray foam can be used in combination with a mineral fiber layer, as the latter has drainage ability. On the interior, spray foam can be used with eco-fiber board for a diffusion-based drying system that may have a ventilated air cavity.

Eco-Wrap typically comprises hydraulic lime modified with natural and Portland cements, fine sand, and at least one compound selected from a group of inorganic layered silicates such as bentonite, vermiculite, montmorillonite, silica powder, colloidal clay, and at least one compound selected from a group of natural cements that includes fly ashes or pozzolanic materials (metakaolin, ground brick, and enamel glass) or diatomaceous earth or ground bark (biocide).

Moreover, Eco-Wrap includes fibers from at least one compound selected from a group of bio-fibers that includes wood, cellulose, hemp, flax, jute, or bamboo and at least one compound selected from a group of reground/recycled materials such as expanded polystyrene from molded products such as boards, cups, packaging materials, or glass. This recycled material may be ground to a fiber or particle size as needed (e.g., about 60 to about 240 microns) to provide the required characteristic length for these performance aspects:
a) to allow for expansion of freezing water and thereby provide a high degree of freeze-thaw durability;
b) to provide the interruption in crack propagation through the brittle inorganic matrix of stucco; and
c) to provide a degree of elasticity to accommodate movements caused by the structure and gas-filled thermal insulation foams.

Eco-Wrap may include at least one compound selected from a group of bio-chemical and industrial surfactants, a dispersive and bonding polymer, or a biocide. These polymers can provide multiple functions. For example, hydroxypropyl methyl cellulose not only increases bonding and allows usage of a non-wetting aggregate taken from recycling, but also reduces the volumetric fraction of water added to the dry mix. The reinforcing mesh is made either of metal or polymers (e.g., fiberglass, polypropylene, etc.).

The pore structure of Eco-Wrap 20 provides an ability to transfer water vapor at a desired level. That structure also makes Eco-Wrap 20 less susceptible to shrinkage during drying (typically less than 0.25% after de-molding of the test specimen), and resistant to cracking caused by structural deformations and hygro-thermal movements. Effectively, Eco-Wrap 20 has improved resistance to cracking in comparison to conventional plasters currently used in exterior insulation systems.

Curing cement to achieve the required strength after two days causes a high moisture content and may result in subsequent cracking. To avoid cracking, additives to Eco-Wrap 20 increase its water retention and thereby dramatically improve the tolerance to poor curing conditions in hot climates. The period of initial water retention is thus climate dependent. The present invention permits changing the degree of water retention during the design of the Eco-Wrap mix. In effect, the combined possibilities of the selection of the air, water, and vapor controlling properties improve the durability of building wall assemblies.

The present invention includes different Eco-Wrap classes designed for use in different climates, according to standard building specifications. One typical class of Eco-Wrap is semi-impermeable for water vapor (WV) with WV permeability coefficient measured by ASTM E96 dry cup method of between 0.1 perm and 0.5 perm (6 to 28 ng/(m²s Pa)) prepared for use in hot and humid climates. With the rate of air transmission of Eco-Wrap tested at 50 Pa lower than 0.021/(m²s Pa), this material is also suitable for air control in hot and humid environments.

Another class of Eco-Wrap is semi-permeable, with a water vapor permeability coefficient measured by ASTM E96 dry cup method between 4 perm and 8 perm (230 to 460 ng/(m²s Pa)) and is suitable for mixed and cold climate applications. Eco-Wrap also provides additional protection from moisture that is enclosed during the construction process, or that infiltrates from incidental water leakage.

For enhanced dissipation of incidental water leakage, finishing layer 22, 32, or 42 may include a granular finish. Finishing layer 22, 32, or 42 may include micro-pores to enhance the transport of moisture or fillers for improving the radiant barrier properties. Surface finish 22, 32, or 42 may comprise latex acrylic or latex rubber, mineral oil, or pigments. When measured with the ASTM E96 standard test method—dry cup, Eco-Wrap may have water vapor permeability of between 0.1 to 0.5 perms (6 to 28 ng/m²s Pa) for use in warm climates or up to 10 perms (570 ng/m²s Pa) for use in cold climates.

The use of any permeable or semi-permeable thermal insulating material such as eco-fiber board, spray polyurethane foam, or even expanded polystyrene, when covered with Eco-Wrap to achieve good drying capability, is within the scope of the present invention. The method of manufacturing an Eco-Wrap comprises one or more of these steps:
  a) producing a mix that comprises one or two components from each of the three following groups:
    1) a binder that includes S-type hydrated lime mixed with natural cements and Portland cement filled;
    2) a natural fibrous aggregate such as obtained from recycled wood, newsprint or other biological fibers mixed with post-industrial or post-consumer ground glass, etc.; and
    (3) a selected bio-chemical or/and industrial polymeric admixture to provide required dispersion of the recycled thermal insulation materials and the bonding to the substrate.
  The mix may include at least one additional compound selected from a group consisting of diatomaceous earth, silica powder, or ground bark. The recycled materials may be fiberized or ground to a predetermined size to provide improvement of selected performance aspects.
  b) using a mix that preferably includes at least one compound selected from a group of bio-chemical and industrial surfactants, and dispersive and bonding polymers. The polymers can provide multiple functions. For example, hydroxypropyl methyl cellulose increases bonding and allows usage of a non-wetting aggregate taken from the recycling and reduces the volumetric fraction of water added to the dry stucco mixture.
  c) using an Eco-Wrap that has a water vapor permeability of between 0.1 to 0.5 perms (6 to 28 ng/m²s Pa), class 1, or between 4 and 8 perms (230 to 460 ng/m²s Pa), class 2, when measured with the ASTM E96 standard test.

One aspect of the invention comprises an external insulation appliqué system for stepped application to a building wall construction that is exemplified in one of two systems:
  1) assembly comprising a finishing layer with sufficient water vapor permeability is placed in direct contact with the composite of permeable or semi-permeable thermal insulation arranged onto a wall of a building, and the Eco-Wrap, which has a capillary active and hygroscopic performance to achieve a sufficient water resistance and to facilitate accelerated drying of the insulation. The composite thermal insulation and Eco-Wrap also functions as an air barrier system. The layer of thermal insulation is preferably selected from a group comprising fiber board, open cell polyurethane foam, closed cell polyurethane foam, and expanded polystyrene. The spray polyurethane foam is preferably applied to both the front and the rear sides of the fiber boards, to facilitate drainage and accelerated drying of the exterior insulation system.
  2) the new or retrofitting exterior system comprises impermeable or semi-permeable thermal insulation in which the exterior finishing layer has no water capacity and is directly in contact with the insulation layer. Good moisture management requires using a ventilated air gap on the other side of the Eco-Wrap, and an air barrier on the other side of the ventilated air barrier.

Figure 2:
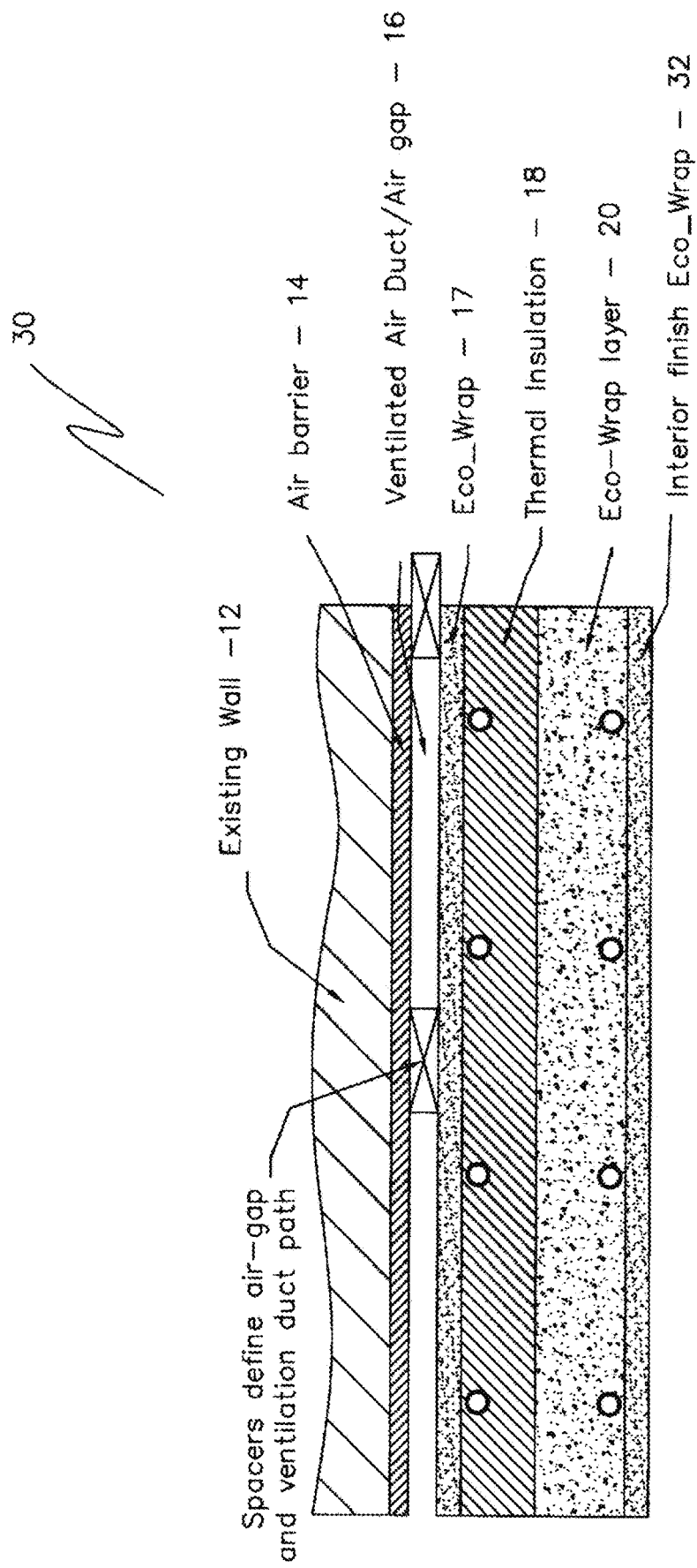
FIG. 2 is a schematic view of a typical Eco-Wrap layered, system panel cross-section interior retrofit of a wall in hot and humid climate.

Referring now to FIG. 2, there is shown a schematic cross-section view of another embodiment of an interior retrofit assembly 30 in a hot and humid climate (e.g., Florida) constructed in accordance with the principles of the present invention. Assembly 30 has five layers, starting from existing wall structure 12 on the top: air barrier 14; ventilated air cavity 16; thermal insulation 18; Eco-Wrap with PEX tubing 22; and two interior finishing layers 22, 32, one facing the cavity being Eco-Wrap 22, the other one facing the interior environment being Eco-Wrap or gypsum panels 32.

The system shown in FIG. 2 restricts the passage of air and liquid water while permitting the transfer of water vapor to a degree required by the climatic conditions. The rate of water vapor transmission across the system is controlled by all components of assembly 30 but it also varies with the moisture content of Eco-Wrap 20 and thermal insulation 18.

Figure 3:
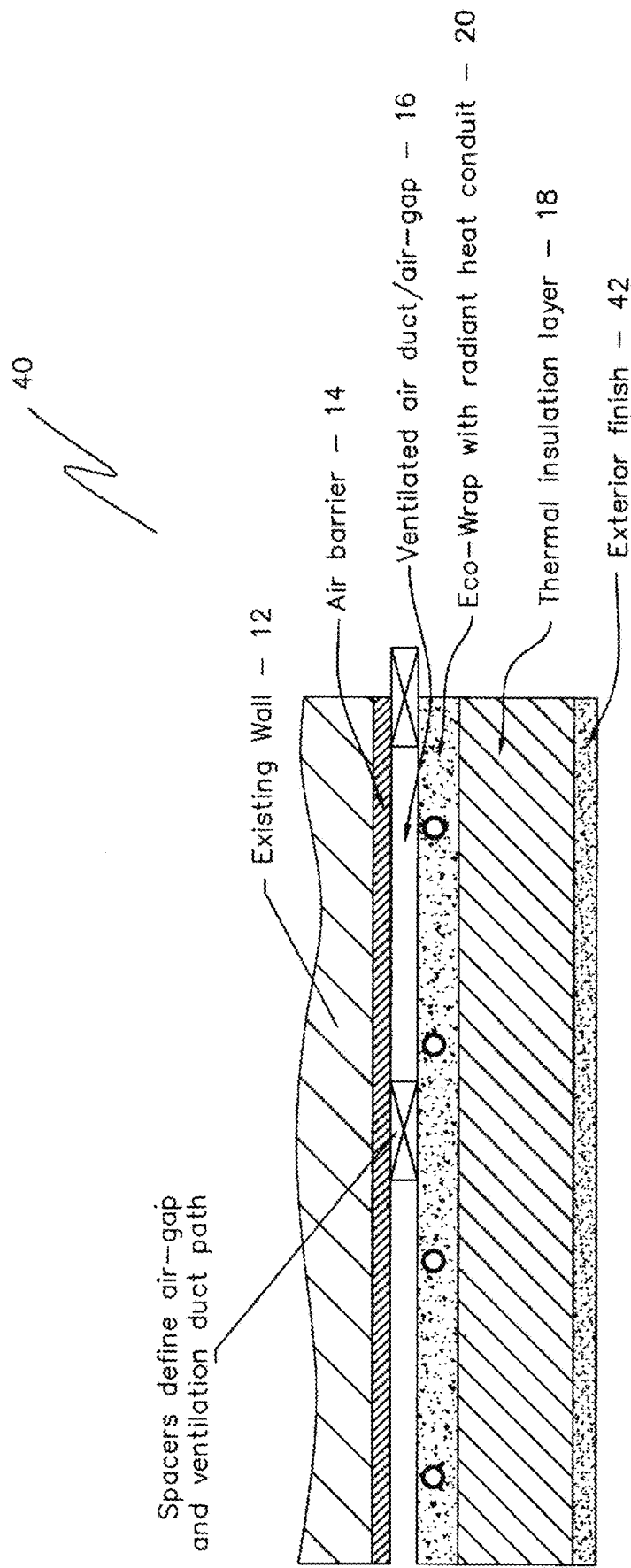
FIG. 3 is a cross-section, schematic view of an exterior RT assembly.

Referring now to FIG. 3, there is shown a schematic view of an exterior retrofit assembly 40 with a much higher level of thermal insulation. Eco-Wrap heating/cooling layer 20 is now placed behind thermal insulation 18 and exposed to ventilated air gap 16. In hot and humid climates, air layer 16 is connected with indoor air and is used to exhaust ventilation air to provide convective cooling. In cold climates, air layer 16 is opened in the summer but closed in the winter, providing partial water management for existing wall 12. In contrast to assembly 10 (FIG. 1), where hydronic heating is the main source of energy supply for the occupant space, the hydronic system in insulation layer 18 (FIG. 3) can be called an auxiliary, because it is designed to reduce the actual loads acting on the building. Cooling is provided by another hydronic system, not shown, typically one placed in the floor.

The layers outboard of the ventilated cavity, namely, thermal insulation 18, Eco-Wrap 20, and exterior finish 42 must accomplish these elements of performance:
  1) provide the required characteristic length allowing for expansion of freezing water and thereby provide a high degree of freeze-thaw durability;
  2) provide the interruption in crack propagation through the brittle inorganic matrix of the plasters and thereby reduce shrinkage and cracking ability; and
  3) provide a degree of elasticity to accommodate movements caused by the structure or gas-filled thermal insulating materials, if used, next to Eco-Wrap layer 20.

Eco-Wrap 20 is designed to have the target capillary active or absorbent and hygroscopic performance. The micro-porous system of Eco-Wrap 20 is inherently a capillary active and hygroscopic and, as such, Eco-Wrap can change the rate of water transfer with the change of its moisture content. At a low relative humidity (RH), Eco-Wrap 20 has a resistance to water vapor diffusion higher than that at a high RH.

Eco-Wrap 20 in combination with thermal insulation 18 provides a durable water protection under conditions involving prolonged presence of water and thermal gradients. The required degree of water storage depends on physical properties of Eco-Wrap 20 and varies with the considered climate. In cold and mixed climates, Eco-Wrap 20 and insulation 18 are preferably enclosed by a highly water permeable vapor finishing layer 42. In climates with a frequent interim wetting and drying, layers 18, 20, and 42 are preferably designed with lower water vapor permeance.

Different aggregate compounds may be used to modify moisture characteristics of Eco-Wrap 20. As stated hereinabove, an inorganic layered silicate, such as bentonite, vermiculite, or montmorillonite, or selected particulate such as silica, diatom earth, or powdered recycled glass can be used for these layers made by mixing components. The binder mix for air barrier 14 may include S-type hydrated lime, natural cements (pozzolanic materials, ground clay bricks, fly ash) and Portland cement. Fibrous aggregate obtained from recycled wood, newsprint or other biological fibers is mixed with post-industrial or post-consumer recycled PP or PET fibers and ground insulating foams. A selected mix of biological and industrial polymers is added to provide required dispersion of the recycled materials and bonding to the substrate that typically is a thermal insulating material 18, either fibrous such as eco-fiber, mineral (basalt) board, or foamed plastic (e.g., polyisocyanurate or expanded polystyrene board). Outer finishing layer 42 may also be pre-treated with ingredients (e.g., bark) which act as biocides and enhance protection from microbial deterioration in the form of mold. Other polymeric compounds can also be incorporated into outer finishing layer 42 to expand the range of control over water, and vapor transport.

Figure 4:
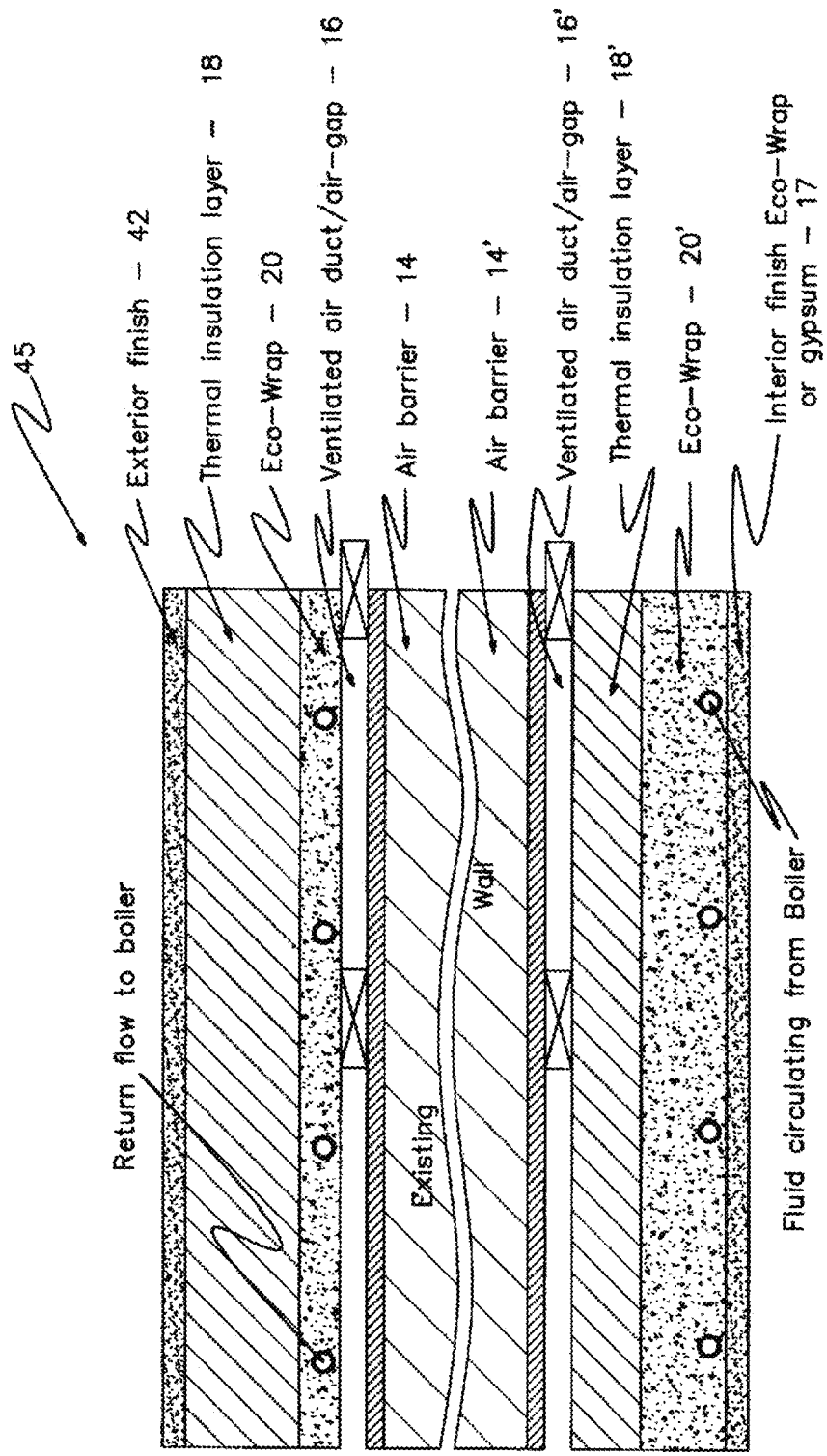
FIG. 4 is a schematic view of an Eco-Wrap system retrofit to interior wall in extremely cold (e.g., Alaska) climate.

Referring now to FIG. 4, there is shown a schematic view of an assembly 45 retrofit to an interior wall, not shown, in an extremely cold climate, such as often existing in Alaska. In extremely cold climates, where a large thickness of exterior insulation is needed and traditional heat pump technology is not adequate or efficient, a condensing boiler, not shown, can be used for heating. Return fluid from exterior PEX tubing may also be used for heating on the interior side. The temperature of heating medium in extremely cold climates is generally higher than such used in heat pumps so that both the exterior 20 and interior heating systems 20' easily satisfy the requirements of the energy demand.

Layers 14, 16, 18, and 20 are placed in mirror configuration closer to the building cavity and labeled 14', 16', 18', and 20', respectively. Exterior finish 42 and internal finish 17 are applied to outer and inner surfaces, respectively.

EXAMPLES OF ECO-WRAP APPLICATIONS

Hygric Properties of Eco-Wrap

FIGS. 5 through 8 highlight the fact that hygric properties can be designed independently of fractions of cement and aggregate.

Several laboratory samples of Eco-Wrap materials were prepared and tested. The sample denoted "C" (FIG. 5) was produced with the ratio hydraulic lime:fly-ash:cement:sand 1:1:1:6 while sample "B" represent a traditional base-coat of Portland cement plaster with the ratio of cement:lime:sand being 4:1:16.

Figure 5:
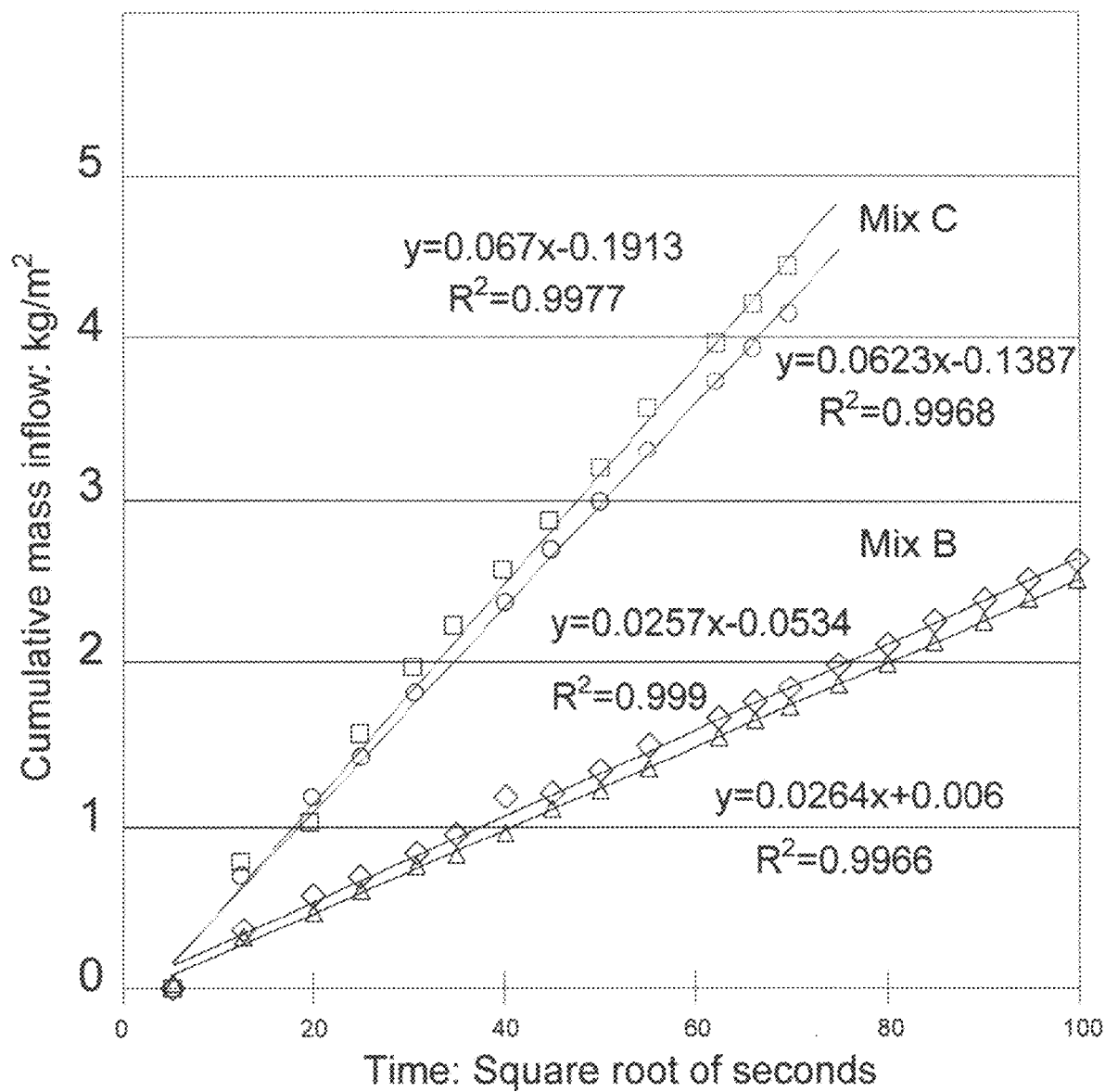
FIG. 5 is a graph in which a lime-based mix shows wetting from free water surface faster than mix B based on standard Portland cement.
Figure 6:
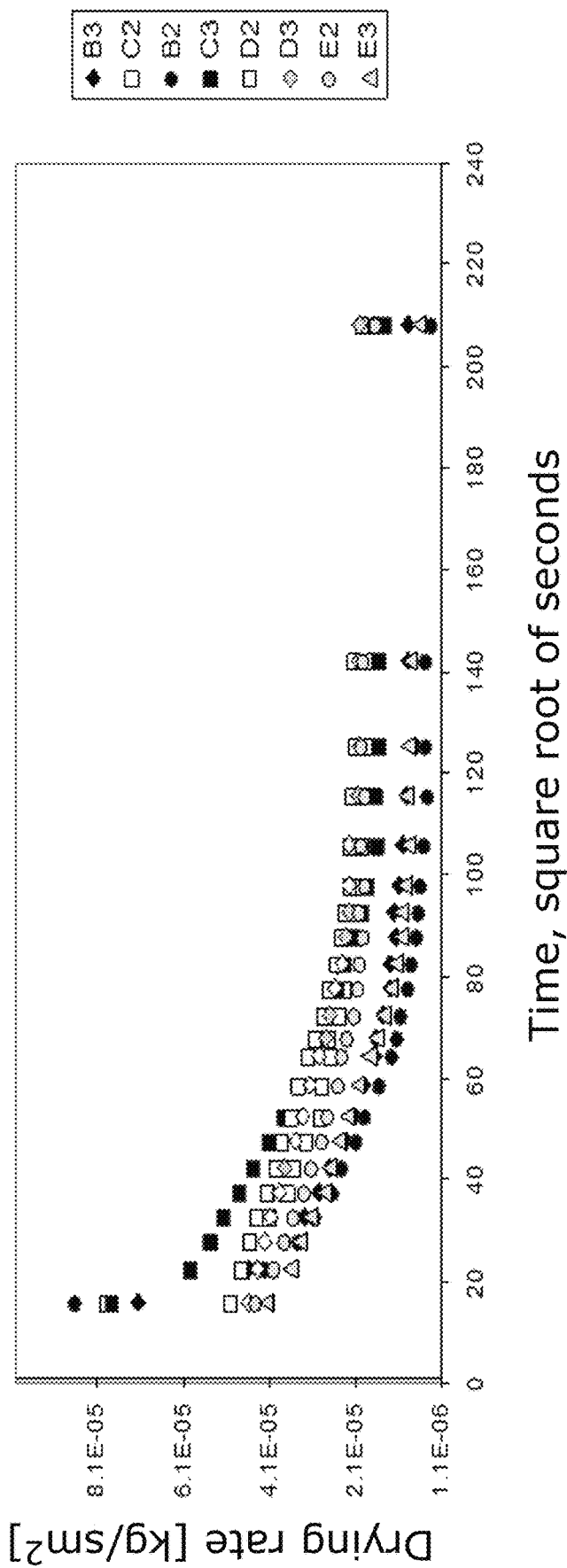
FIG. 6 is a graph showing drying rate versus drying time for standard Portland cement and Eco-Wrap based on lime with varying fraction of fibers.
Figure 7:
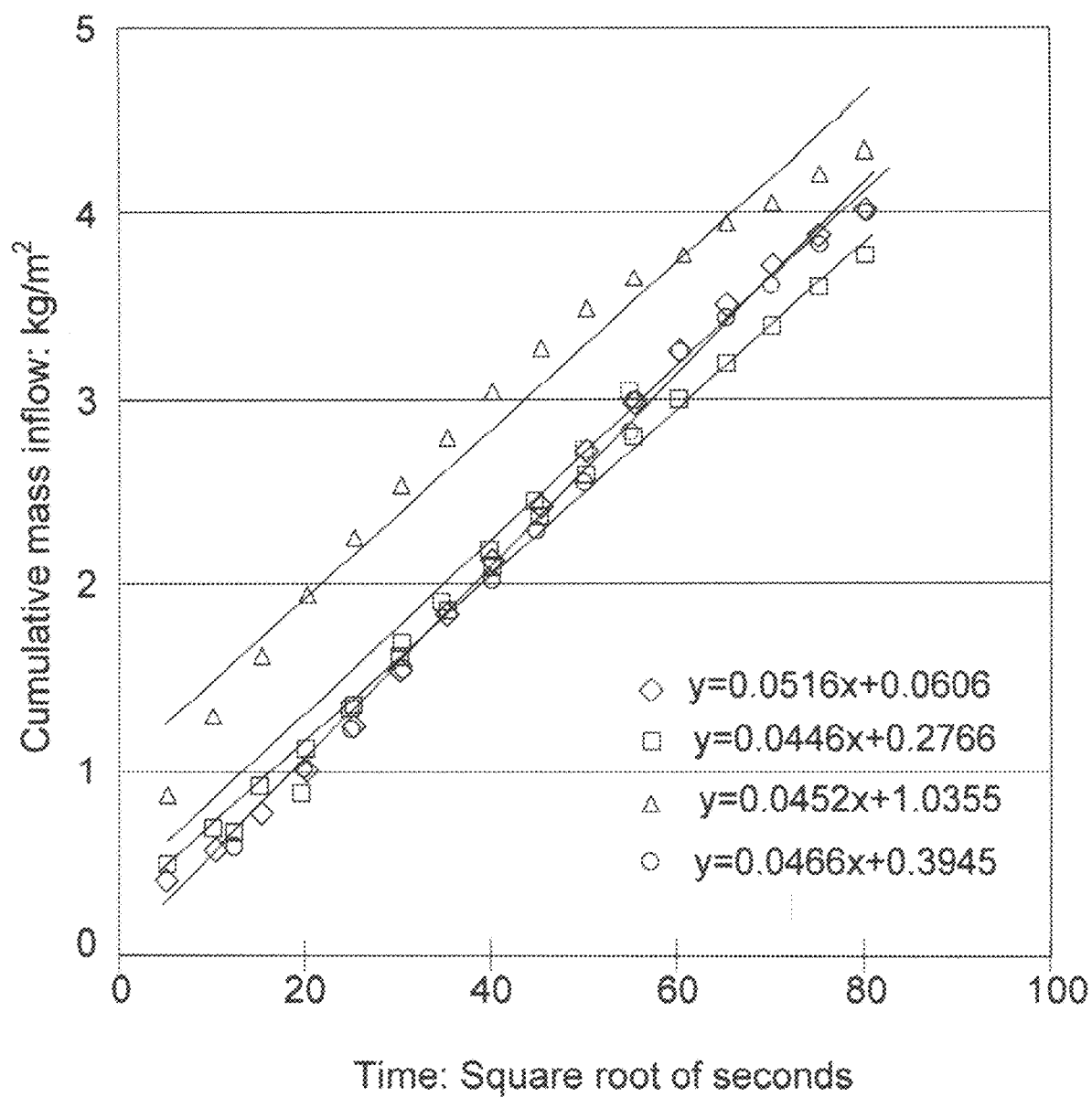
FIG. 7 is a graph showing water absorption of Eco-Wrap with polystyrene beads.
Figure 8:
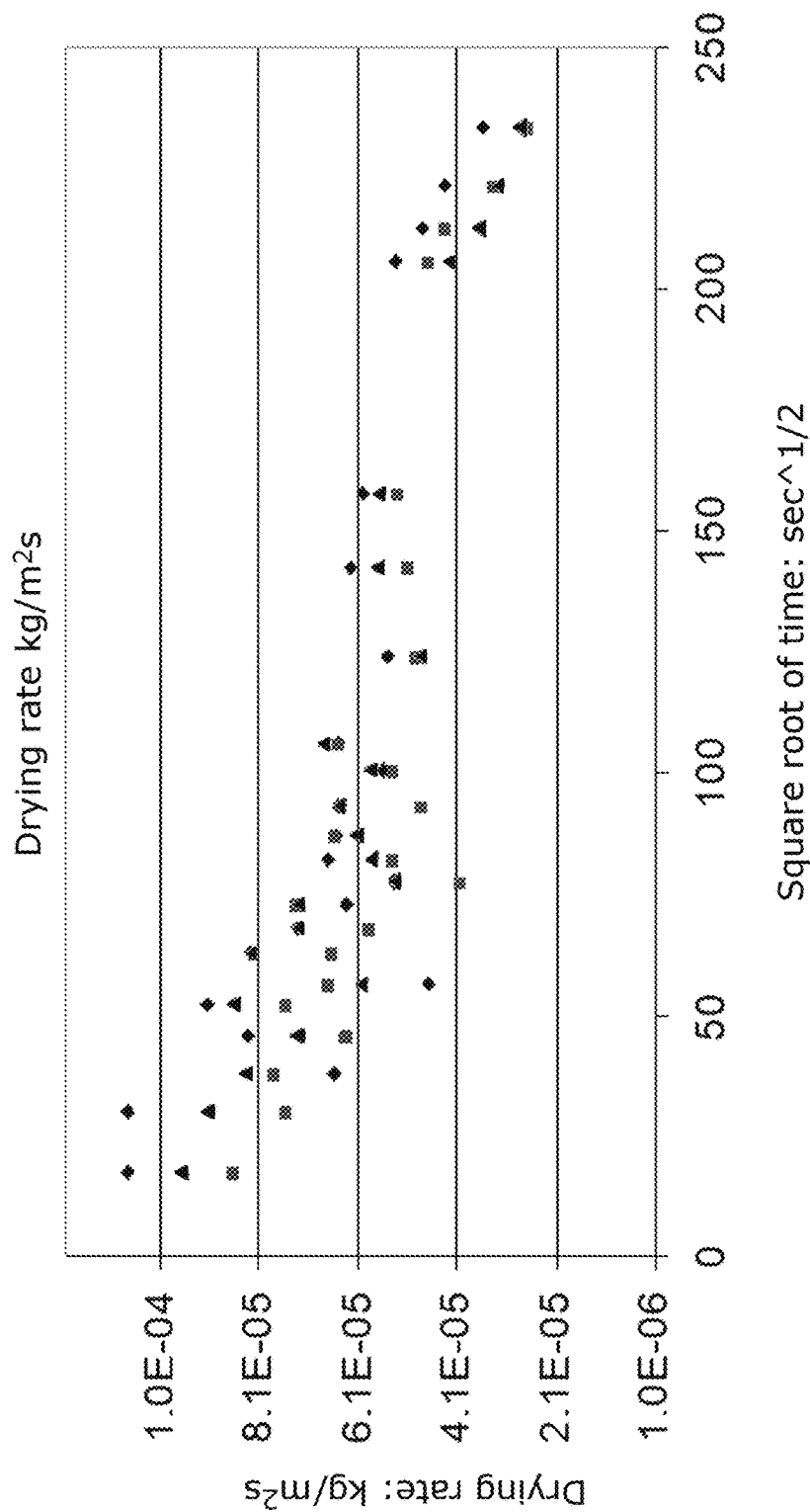
FIG. 8 is a graph showing drying rates versus time measured on the Eco-Wrap shown in FIG. 6.

Mixes C and D, shown in FIGS. 5 and 6 are binder compositions used in the instant invention. Another mix, shown in FIGS. 7 and 8, is the subject of this invention, namely, used recycled polystyrene beads in the Eco-Wrap mix.

Eco-Wrap on Eco-Fiber Board in Exterior Thermal Insulations in Cold Climates

Since 1994 flexible and rigid wood-fiber insulation boards have been produced in Germany in accordance with a standard WF-EN 13171-T3-CS (10/Y) 20-TR7, 5-WS2, 0-MU5-AF100. When a multi-fiber system is used as an additive to wood fibers to modify its physical properties, the resulting product is known as "eco-fiber board." In this case, eco-fiber board has a density of approximately 120 kg/m$^3$, a thermal conductivity measured at 10° C. equal to 0.037 W/(m·K), or thermal resistivity of 3.9 (hr ft$^2$)/BTU in, a specific heat of 2100 J/(kg K), and a thickness of 80 mm (3¼ inch). The eco-fiber board was adhered to an OSB substrate in a wood frame house using Sto Corp manufactured primer/adhesive, placed with a trowel. The Eco-Wrap was also manufactured by a Sto Corp US laboratory with the mix designed in accordance with this invention. Glass fiber mesh (5 oz) was placed in the Eco-Wrap and the finish layer was a StoSilco® Lastic material—a ready-mixed, silicone-enhanced, smooth elastomeric exterior wall coating that is weather and mildew resistant. Total thickness of the Eco-Wrap was 12 mm and hydronic heating or cooling was applied.

Continuous External Insulation System for Retrofitting Metal Building in New York First, using an extruded polystyrene board, 50×50 mm (2×2") strips were cut and ½-inch plywood strips attached to them. The strips were attached to the metal surface with foam adhesive and a closed cell, sprayed polyurethane foam was applied between extruded polystyrene strips placed on the metal surface, serving as both distance marks and locations of mechanical fasteners for reinforcing mesh for the finishing layer. The final, cured spray foam product had a nominal density of 30.4 kg/m$^3$ and design thermal resistance of 1.05 (m$^2$·K)/W per 25 mm (R6 per inch). Compressive strength was 222 kPa and tensile strength was 337 kPa, sufficient to ensure adhesion to the substrate and cohesion of the foam.

In this case, the Eco-Wrap, used as an external layer adhered to the sprayed foam insulation, had additional admixture of silica powder to reduce its water vapor transmission rate. The finishing layer applied on the Eco-Wrap was acrylic coating with permeance below 1.0 perm. Again, no hydronic heating or cooling was needed for this process.

Panels for Interior Retrofitting of Masonry in Warm Climate of China

Referring now to FIG. 8, there is shown a photographic view of the preparation of the panels in the Tangdun Company. In the next example, magnesium oxide cement with admixture of powdered rice hulls, fiberized rice bush, cellulose, wood fibers, and polypropylene (post-industrial fibers) was provided.

By adding a thermal mass of hydronic heating/cooling that also permits controlling the contribution of thermal mass by regulating the temperature of the flowing water, and by using large radiative surfaces of walls (either interior or exterior walls) and using water-based heat-pump technology, the currently most efficient source of heating was obtained. Furthermore, energy modeling indicated that locating the heat exchangers near the wall's surface was much more economical than locating them as tradition says, in floors (see Table 1).

TABLE 1

Effect of Radiant Panel Location on Energy Demand

| Location | Heating Demand (GJ) | Cooling Demand (GJ) |
|---|---|---|
| Wall surface | 58 | 24 |
| Floor surface | 98 | 31 |

While traditional air-mixing methods are not effective in equalizing the temperature differences between rooms, placing PEX next to a wall surface (FIG. 8) with negligible thermal resistance to the interior can be effective. Furthermore, using circulating medium temperatures below 49° C. (120° F.), as these temperatures are possible to achieve from solar panels, facilitates the integration.

Panels for Interior Retrofitting of Frame Walls

Figure 10:
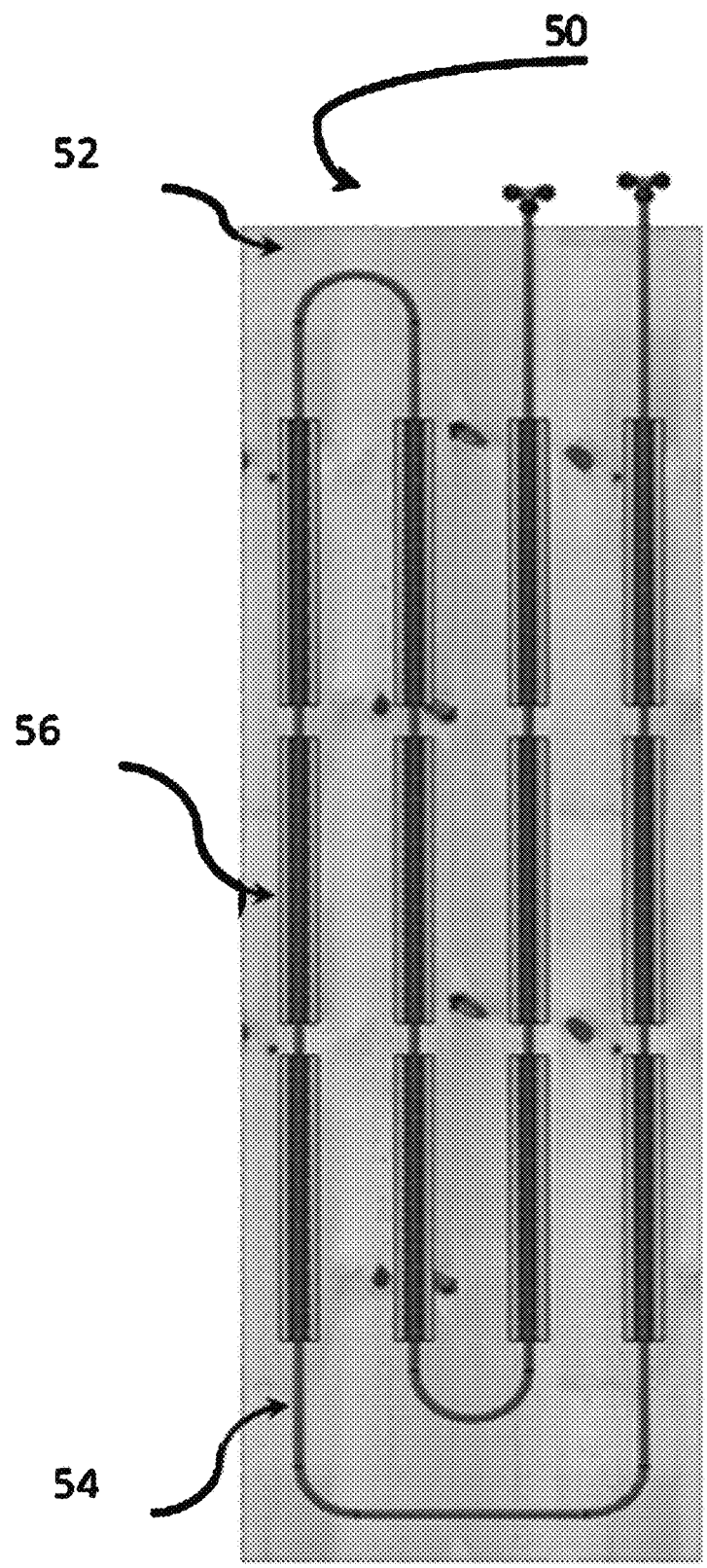
FIG. 10 is a photographic plan view showing the structure of a heating/cooling panel.

Referring now to FIG. 10, there is shown a view of an example of a heating/cooling panel 50. A sheet of 12 mm (½ inch) thick plywood 52 has approximately 8.5 m long (28 ft), 12 mm in diameter (0.5 inch) PEX radiant heat tube with oxygen barrier 54 distributing heat toward the panel surface via an array of aluminum heat transfer plates 56. A galvanized or painted metal sheet, not shown, with adequate profiles for inserting the tubing can be used in place of the plywood. The plywood is covered on both sides by a layer of Eco-Wrap. On the back the layer, Eco-Wrap thickness is 6 mm (¼")) to maintain a deformation-free panel. On the front of plywood 52, the thickness of Eco-Wrap is 25 mm (1") in the preferred embodiment. A layer of thermal insulation covered by a layer of plaster coating is placed between these thermally insulating studs. An air gap with thickness varying between 4- and 12-mm is provided if a spray foam is used, or air gap has a somewhat more regular air space with 6-10 mm thickness if preformed foam insulation is used. Typically, gypsum or other finishing panels are mounted on the insulation/plywood composite studs placed every 1.22 m (4 ft) and the board surface is painted.

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a great number of variations of the devices, device components, and method steps set forth in the present description. As will be obvious to one of skill in the art, methods and devices useful for the present methods can include a great number of optional composition and processing elements and steps.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when compositions of matter are claimed, it should be understood that compounds known and available in the art prior to Applicant's invention, including compounds for which an enabling disclosure is provided in the references cited herein, are not intended to be included in any composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of," and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Having thus described the invention, what is desired to be protected by Letters Patent is presented in the subsequently appended claims.

What is claimed is:

1. An external retrofitting appliqué for stepped application to a building wall construction, the appliqué comprising:
   a) an air barrier layer being at least semi-permeable for moisture;
   b) a ventilated air cavity used to modify temperature, remove water, and modify relative humidity of ventilation air;
   c) a layer of thermal insulation;
   d) a capillary active composite material, in which a hydronic heating or cooling system is located; and
   e) a surface finishing layer designed for the exterior surface of the wall.

2. The external retrofitting appliqué for stepped application to a building wall construction in accordance with claim 1, wherein the composite material comprises:
   i) a binder including S-type hydrated lime mixed with natural cements and Portland cement;
   ii) a fibrous aggregate mix including organic fibers obtained from recycled wood, newsprint, or other biological fibers mixed with post-industrial or post-consumer fibers;
   iii) a fine powder aggregate sand; and
   iv) a mix of biological and industrial polymers utilized to provide required dispersion of the recycled materials and bonding to the substrate.

3. The external retrofitting appliqué for stepped application to a building wall construction in accordance with claim 1, further comprising reinforcement mesh disposed between the capillary active composite material layer and the surface finishing layer.

4. The external retrofitting appliqué for stepped application to a building wall construction in accordance with claim 3, wherein the reinforcing mesh comprises at least one of a group of materials consisting of: metal wire and flexible polymeric material.

5. The external retrofitting appliqué for stepped application to a building wall construction in accordance with claim 1, wherein the surface finishing layer comprises at least one of a group of materials consisting of: the capillary active composite material and a conventional, textured, insulating material used in exterior insulation finishing systems.

6. The external retrofitting appliqué for stepped application to a building wall construction in accordance with claim 1, wherein the capillary active composite material comprises:
   i) hydraulic lime modified with natural and Portland cements;
   ii) fine sand; and
   iii) at least one compound selected from a group of materials consisting of: inorganic layered silicates and natural cements including at least one material of a group consisting of fly ashes and pozzolanic materials, diatoms earth, and ground bark.

7. The external retrofitting appliqué for stepped application to a building wall construction in accordance with claim 1, wherein the capillary active composite material comprises fibers from:
   i) at least one compound selected from a group of bio-fibers consisting of: wood, cellulose, hemp, flax, jute, bamboo; and
   ii) at least one compound selected from reground/recycled materials consisting of expanded polystyrene from molded products.

8. An internal retrofitting appliqué for stepped application to a building wall, comprising:
   a) an air barrier layer being at least semi-permeable for moisture;
   b) a ventilated air cavity used to modify temperature, remove water, and modify relative humidity of ventilation air;
   c) a layer of thermal insulation;
   d) a capillary active composite material, in which a hydronic heating or cooling system is located; and
   e) a surface finishing layer designed for the interior surface of the wall.

9. The internal retrofitting appliqué for stepped application to a building wall in accordance with claim 8, wherein the capillary active composite material comprises:
   i) a binder including S-type hydrated lime mixed with natural cements and Portland cement;
   ii) a fibrous aggregate mix including organic fibers obtained from recycled wood, newsprint, or other biological fibers mixed with post-industrial or post-consumer fibers;
   iii) a fine powder aggregate sand; and
   iv) a mix of biological and industrial polymers utilized to provide required dispersion of the recycled materials and bonding to the substrate.

10. The internal retrofitting appliqué for stepped application to a building wall in accordance with claim 8, further comprising reinforcement mesh disposed between the capillary active composite material layer and the surface finishing layer.

11. The internal retrofitting appliqué for stepped application to a building wall in accordance with claim 10, wherein the reinforcing mesh comprises at least one of a group of materials consisting of: metal wire and flexible polymeric material.

12. The internal retrofitting appliqué for stepped application to a building wall in accordance with claim 8, wherein the surface finishing layer comprises at least one of a group of materials consisting of: the capillary active composite material and a conventional, textured, insulating material used in exterior insulation finishing systems.

13. The internal retrofitting appliqué for stepped application to a building wall in accordance with claim 8, wherein the capillary active composite material comprises:
   i) hydraulic lime modified with natural and Portland cements;
   ii) fine sand; and
   iii) at least one compound selected from a group of materials consisting of: inorganic layered silicates and natural cements including at least one material of a group consisting of fly ashes and pozzolanic materials, diatoms earth, and ground bark.

14. The internal retrofitting appliqué for stepped application to a building wall in accordance with claim 8, wherein the capillary active composite material comprises fibers from:
   i) at least one compound selected from a group of bio-fibers consisting of: wood, cellulose, hemp, flax, jute, bamboo; and
   ii) at least one compound selected from reground/recycled materials consisting of expanded polystyrene from molded products.

* * * * *